(12) United States Patent
Shi et al.

(10) Patent No.: US 8,467,396 B2
(45) Date of Patent: Jun. 18, 2013

(54) METHOD OF SIGNAL TO TIME-SPECTRUM CHANNEL RESOURCE MAPPING FOR WIRELESS COMMUNICATION SYSTEM

(75) Inventors: Qicai Shi, Coral Springs, FL (US); Neiyer Correal, Cooper City, FL (US); Spyros Kyperountas, Weston, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 646 days.

(21) Appl. No.: 12/638,391

(22) Filed: Dec. 15, 2009

(65) Prior Publication Data

US 2011/0142027 A1 Jun. 16, 2011

(51) Int. Cl.
*H04L 12/28* (2006.01)
(52) U.S. Cl.
USPC ....................................... 370/395.4
(58) Field of Classification Search
None
See application file for complete search history.

(56) References Cited

U.S. PATENT DOCUMENTS 7,457,588 B2 11/2008 Love et al.
2003/0161281 A1* 8/2003 Dulin et al. ............... 370/328
2004/0028018 A1* 2/2004 Cain ......................... 370/338
2008/0200196 A1 8/2008 Muharemovic et al.
2008/0311922 A1* 12/2008 Choi et al. ................. 455/450

FOREIGN PATENT DOCUMENTS

| EP | 2077677 A1 | 7/2009 |
|---|---|---|
| WO | 2007027052 A1 | 3/2007 |
| WO | 2009002117 A1 | 12/2008 |

\* cited by examiner

*Primary Examiner* — Chirag Shah
*Assistant Examiner* — Jenkey Van
(74) *Attorney, Agent, or Firm* — Barbara R. Doutre

(57) ABSTRACT

A communication device and method of allocating spectrum resources in a communication system to protect data to be transmitted are disclosed. The communication channel resource is divided temporally to form regions. Data to be transmitted is separated into data portions. Each data portion is able to be transmitted over one of the regions. The data portions are prioritized based on the importance of the data portion. The regions are ranked based on the transmission reliability thereon. The prioritized data portions are mapped to the ranked regions such that more important data portions are mapped to more reliable regions and less important data portions are mapped to less reliable regions. The prioritized data is output temporally in order of importance to enable the mapping of the prioritized data.

14 Claims, 6 Drawing Sheets

METHOD OF SIGNAL TO TIME-SPECTRUM CHANNEL RESOURCE MAPPING FOR WIRELESS COMMUNICATION SYSTEM

TECHNICAL FIELD

The present application relates generally to allocation of time-spectrum resources in a communication system, and in particular to mapping of a signal to specific portions of the time-spectrum channel resource based on data prioritization to protect data to be transmitted.

BACKGROUND

With the ever-increasing public appetite for faster and more reliable connectivity, different systems and modulation schemes have been developed. For example, multimedia communications, such as video transmission, are becoming more and more popular and require high user data rate for good quality of viewing. Presently, Wireless Local Area Networks (WLANs) such as those using IEEE 802.11 standards are capable of providing data rates up to 54 Mbps and higher data rates are expected to be used in the future.

Multi-carrier systems such as those based on filtered multi-tone (FMT) and orthogonal frequency division multiplexing (OFDM) are popular technologies due to their ability to support high data rates and their robustness to multi-path interference. FMT techniques, for example, are able to activate and deactivate individual sub-carriers and the FMT spectrum is highly contained within each sub-band for each slot. This permits FMT techniques to be natural candidates for secondary systems, such as spectrum-sensing cognitive radio systems, in which adjacent channels may be occupied suddenly with relatively strong signals.

It is important to contain the radio frequency (RF) energy of signals both temporally and in the frequency domain. Some multi-carrier systems, such as OFDM systems, contain the RF energy within the communication band and avoid causing harmful interference to adjacent users in the RF band by applying frequency-domain windowing to the signal to limit adjacent channel interference. Other multi-carrier systems, such as scalable advanced modulation (SAM) systems, apply time-domain windowing to each slot to contain the RF energy within the current slot and out of the next slot.

In the frequency domain, other users in the adjacent RF bands will generate inter-carrier-interference (ICI) into both edges of the system's band. Frequency-domain windowing also generates ICI at both edges of a system's RF band. In the time domain, adjacent time slots generate some inter-symbol interference (ISI) to both ends of the current slot. In ISI, successive symbols blur together so that each symbol interferes with a subsequent symbol. ISI is usually caused by multipath propagation. Time-domain slot windowing can also cause ISI of symbols of both ends of a time slot.

All of these effects result in the downgrade of system reliability. It would thus be desirable to provide a more reliable technique for transmission of the data between a communication device and base station or between individual communication devices.

SUMMARY

Various embodiments are presented including a method of protecting data to be transmitted in a communication system, device that protects in the system and the system. In one embodiment, the method comprises dividing a communication channel resource over which the data is to be transmitted in a frame time slot into region, separating the data into data portions, each data portion able to be transmitted over one of the regions, ranking the regions based on the transmission reliability thereon, prioritizing the data portions based on the importance of the data portions, and mapping the prioritized data portions to the ranked regions such that more important data portions are mapped to more reliable regions and less important data portions are mapped to less reliable regions. The data can be transmitted over one or more sub-carriers in a spectrum and the regions are different temporal positions within the sub-carrier(s). The regions may be ranked such that regions at corners of the frame are rated of lowest reliability, regions at other edges are rated of higher reliability and regions within the frame rated the highest reliability.

In another embodiment, a communication device comprises a prioritizer, a ranker, and a mapper. The prioritizer is configured to receive data separated into data portions and prioritize the data portions based on the importance of the data portions. The ranker is configured to rank regions of a communication channel resource over which the data is to be transmitted in a frame time slot based on the transmission reliability thereon, each data portion able to be transmitted over one of the regions. The mapper is configured to map the prioritized data portions to the ranked regions such that more important data portions are mapped to more reliable regions and less important data portions are mapped to less reliable regions.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
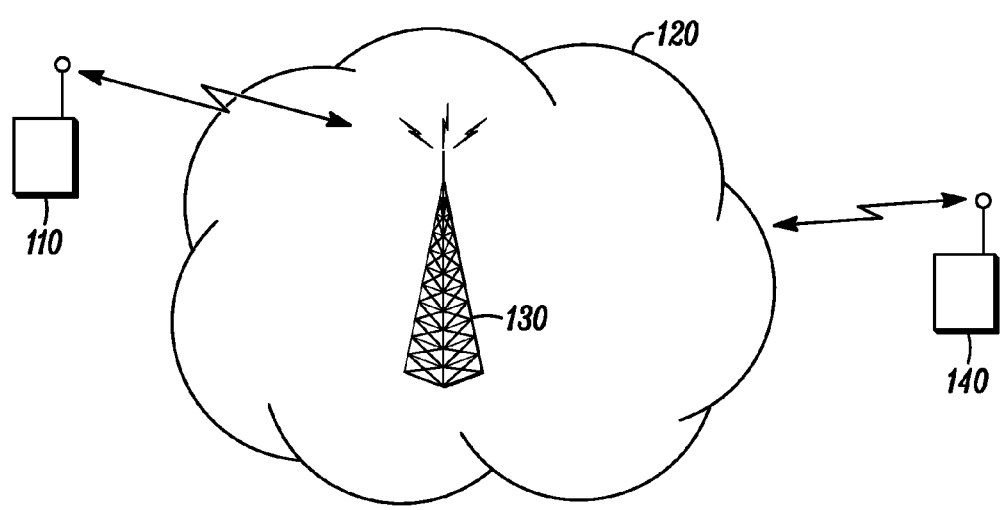
FIG. 1 illustrates one embodiment of a communication system.

The apparatus and method components have been represented where appropriate by conventional symbols in the drawings, showing only those specific details that are pertinent to understanding the embodiments shown so as not to obscure the disclosure with details that will be readily apparent to those of ordinary skill in the art having the benefit of the description herein. Other elements, such as those known to one of skill in the art, may thus be present. Moreover, skilled artisans will appreciate that elements in the figures are illustrated for simplicity and clarity and have not necessarily been drawn to scale. For example, the dimensions of some of the elements in the figures may be exaggerated relative to other elements to help to improve understanding of the embodiments shown.

DETAILED DESCRIPTION

Before describing in detail the various embodiments, it should be observed that such embodiments reside primarily in combinations of method steps and apparatus components related to data protection in a signal by mapping bits of the signal to a channel resource dependent on the importance of the bits. In general, this mapping scheme can be used for any communication system where the least reliable channel resource will be used to transmit the least important information and the most reliable channel resource will be used to transmit the most important information. The method can be employed in single or multi-carrier systems.

One embodiment of a communication system is illustrated in FIG. 1. The system 100 contains communication devices 110, 140 and an infrastructure 120. The communication devices 110, 140 include a transmitter 110 and one or more receivers 140, only one of which is shown. The transmitter 110 initiates a transmission that is eventually received by the receiver 104. The transmission can be analog or digital and may contain audio, textual and/or visual data. The communication devices 110, 140 may communicate using any of a number of known modulation types. The communication devices 110, 140 may be mobile or fixed to one location. The infrastructure 120 includes base stations 130 and other devices, however again only one base station 130 is shown for convenience. Other elements outside of the infrastructure 120 such as access points are not shown for convenience. Each base station 120 serves communication devices that lie within its cell. The communication devices 110, 140 may be in the same or different cells and may communicate through the base station 130 as shown or directly to each other.

Figure 2:
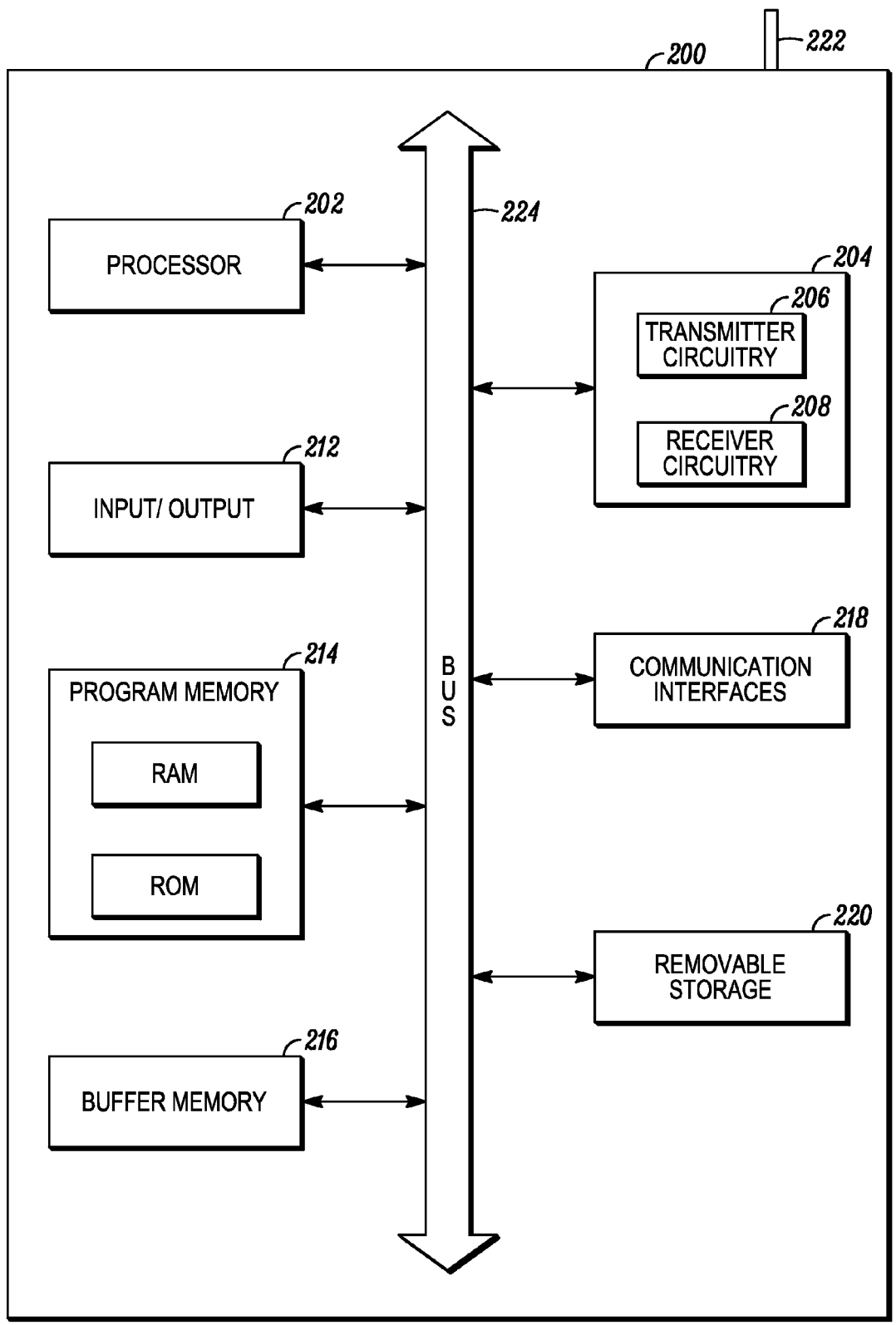
FIG. 2 illustrates a block diagram of an embodiment of a transmitter/receiver.

One example of a block diagram of a transmitter/receiver such as the base station 130 is shown in FIG. 2. The base station 200 contains, among other components, a processor 202, a transceiver 204 including transmitter circuitry 206 and receiver circuitry 208, an antenna 222, input device(s) 212, a program memory 214 for storing operating instructions that are executed by the processor 202, a buffer memory 216, one or more communication interfaces 218, and a removable storage 220. The base station 200 is preferably an integrated unit containing at least all the elements depicted in FIG. 2, as well as any other element necessary for the base station 200 to perform its electronic function. Alternatively, the base station 200 may comprise a collection of appropriately interconnected units or devices, wherein such units or devices perform functions that are equivalent to the functions performed by the elements of the base station 200. The electronic elements are connected by a bus 224.

The processor 202 includes one or more microprocessors, microcontrollers, DSPs, state machines, logic circuitry, or any other device or devices that process information based on operational or programming instructions. Such operational or programming instructions are preferably stored in the program memory 214. The program memory 214 may be an IC memory chip containing any form of random access memory (RAM) or read only memory (ROM), a floppy disk, a compact disk (CD) ROM, a hard disk drive, a digital video disk (DVD), a flash memory card or any other medium for storing digital information. One of ordinary skill in the art will recognize that when the processor 202 has one or more of its functions performed by a state machine or logic circuitry, the memory 214 containing the corresponding operational instructions may be embedded within the state machine or logic circuitry. The operations performed by the processor 202 and the rest of the base station 200 are described in detail below.

The transmitter circuitry 206 and the receiver circuitry 208 enable the base station 200 to respectively transmit a communication signal and receive other communication signals. In this regard, the transmitter circuitry 206 and the receiver circuitry 208 include appropriate circuitry to enable wireless transmissions. The implementations of the transmitter circuitry 206 and the receiver circuitry 208 depend on the implementation of the base station 200 and mobile devices with which it is to communicate. For example, the transmitter and receiver circuitry 206, 208 may be implemented as part of the base station hardware and software architecture in accordance with known techniques. One of ordinary skill in the art will recognize that most, if not all, of the functions of the transmitter or receiver circuitry 206, 208 may be implemented in a processor, such as the processor 202. However, the processor 202, the transmitter circuitry 206, and the receiver circuitry 208 have been artificially partitioned herein to facilitate a better understanding.

The antenna 222 comprises any known or developed structure for radiating and receiving electromagnetic energy at the desired frequency. The buffer memory 216 may be any form of volatile memory, such as RAM, and is used for temporarily storing received information. The input/output devices 212, which are optional, may include an LCD, OLED, or any other known display, one or more speakers and microphones, an alpha-numeric keyboard, isolated buttons, soft and/or hard keys, touch screen, jog wheel, and/or any other known input device. The communication devices 110, 140 of FIG. 1 may have a similar arrangement.

Figure 3:
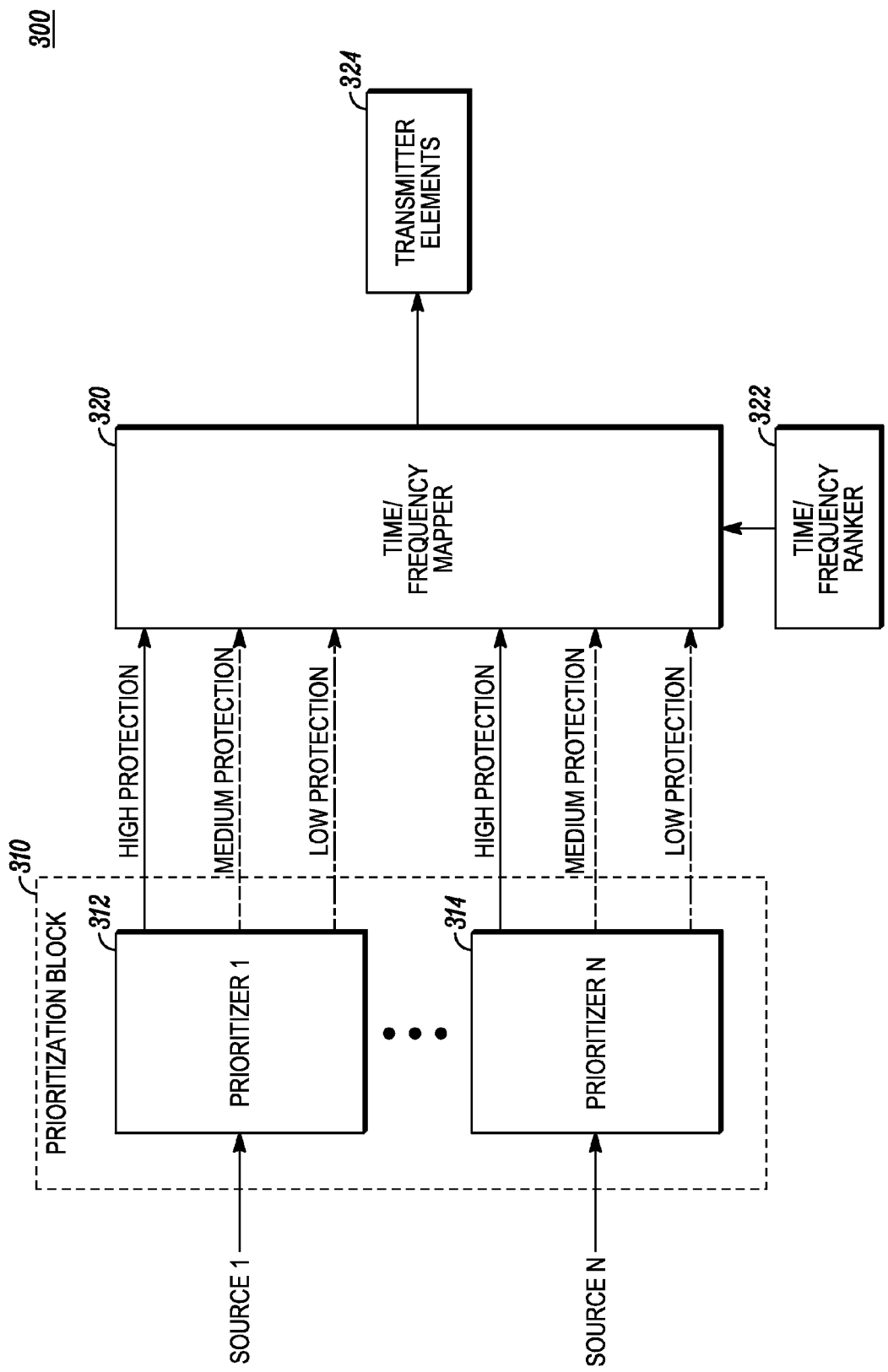
FIG. 3 is a simplified block diagram of an embodiment of a transmitter.
Figure 4:
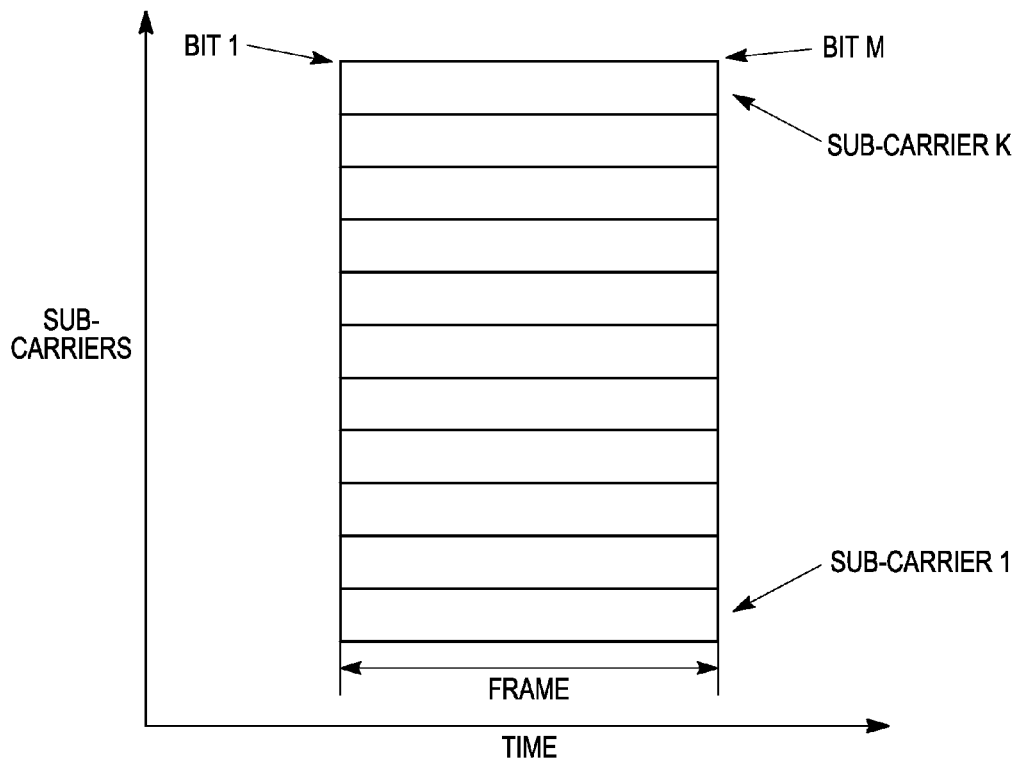
FIG. 4 is an embodiment of the frame structure of a multi-carrier signal.

A simplified block diagram of a transmitter is shown in FIG. 3, while a typical data frame structure is shown in FIG. 4. In FIG. 3, known elements such as mixers, digital-to-analog and analog-to-digital converters, filters, phase shifters, amplifiers, and attenuators as well as feedback loops and I/Q paths, if present, are not shown for simplicity. Sets of source data of each frame are supplied to a prioritization block 310 of the transmitter 300. The prioritization block 310 contains one or more prioritizers 312, 314. The prioritization block 310 may substitute for a serial-to-parallel converter that would otherwise be present in the transmitter. As seen in FIG. 4, each frame in a multi-carrier system transmits data on k sub-carriers of a particular channel. The k sub-carriers are adjacent to each other. Each sub-carrier transmits M bits of information in each frame. The structures of different frames used in various types of communication systems are well known and thus will not be further discussed.

Turning back to FIG. 3, each source data portion is input to a different prioritizer 312, 314 in the prioritization block 310. The source data may be video, audio or others. Each source data is encoded and the encoded data bits are then prioritized by each individual prioritizer 312, 314. For example, in image compression when a discrete cosine transform (DCT) is used by an image coder providing the data to the prioritization block 310, the bits that represent the smallest coefficients are not as important as the bits that represent high energy coefficients. The importance information of the bits can be passed to the prioritizing blocks by the application encoding. The prioritization block 310 then prioritizes the data based on the importance.

Once the data portions have been prioritized by the prioritization block 310, they are supplied along with the priority level to a mapper 320. In one embodiment, the prioritization block 310 outputs the bits of highest priority first and lowest priority last. This permits only one bus to be used between the prioritization block 310 and the mapper 310 and may permit use of only one prioritizer. Note that although only three (high, medium and low) priorities are shown, any number of priorities may be used.

The mapper 320 also receives channel resource ranking information from a ranker 322. The ranker 322 determines the relative level of safety for data transmission for a particular channel resource. The ranker 322 may determine the level of safety using one or more known techniques.

In one embodiment, the ICI level of each sub-carrier is pre-calculated based on the frequency domain windowing coefficients, and then the ICI level is quantized to one of a predetermined number of safety levels (e.g., 4 levels). In another embodiment, the ISI level of each time period of a time slot is pre-calculated based on the time domain windowing coefficients, and then the ISI level is quantized to one of a predetermined number of safety levels (e.g., 3 levels). Another example of such techniques include measurement or estimation of signal/noise (S/N) ratio or strength and received signal strength (RSSI) level of interference on the particular sub-channel. The number and thresholds for the priorities and rankings may be preset by a controller (not shown) in the system or may be set at the transmitter. The ranges for individual priorities and rankings may not be uniform.

The mapping may also be adjusted over time using channel feedback from the receivers in the system. For example, a receiver experiencing consistent fading on a particular sub-carrier or in a particular period of time of one or more frame time slots may inform the transmitter 300 that data on the sub-carriers is received with high level interference. This permits re-assignment of the specific sub-carrier to a lower rank when transmitting to that specific receiver. Thus, the ranker 322 may store in memory multiple sets of different rankings for the sub-carriers (or even time periods within one or more of the sub-carriers) for different receivers.

In one example, the measurement or estimation may be performed during demodulation by the receiver. For example, for the iDEN receiver, automatic gain control (AGC) is measured by the receiver for the purpose of demodulation; this information can also be used for channel resource ranking. In another example, the measurement or estimation may be performed during the idle times in between transmissions. As frames have different lengths, e.g., 67 ms, determining the relative levels for every frame may be unnecessary and too computationally intensive and use an excessive amount of power. Thus, the period over which the relative levels are maintained by the ranker 322 (or the interval between updating of the rankings) may be extended and new safety levels determined intermittently. In one example, if the transmitter 300 is used in a cognitive radio system in the United States, the FCC requires detection of certain secondary devices, such as wireless microphone signals down to a level of −114 dBm every 60 seconds. Thus, the levels may be determined and adjusted, for example, about every 60 seconds. In other embodiments, the time may be shorter, e.g., every 30 seconds, or longer, e.g., every 90 seconds or 120 seconds.

Figure 5:
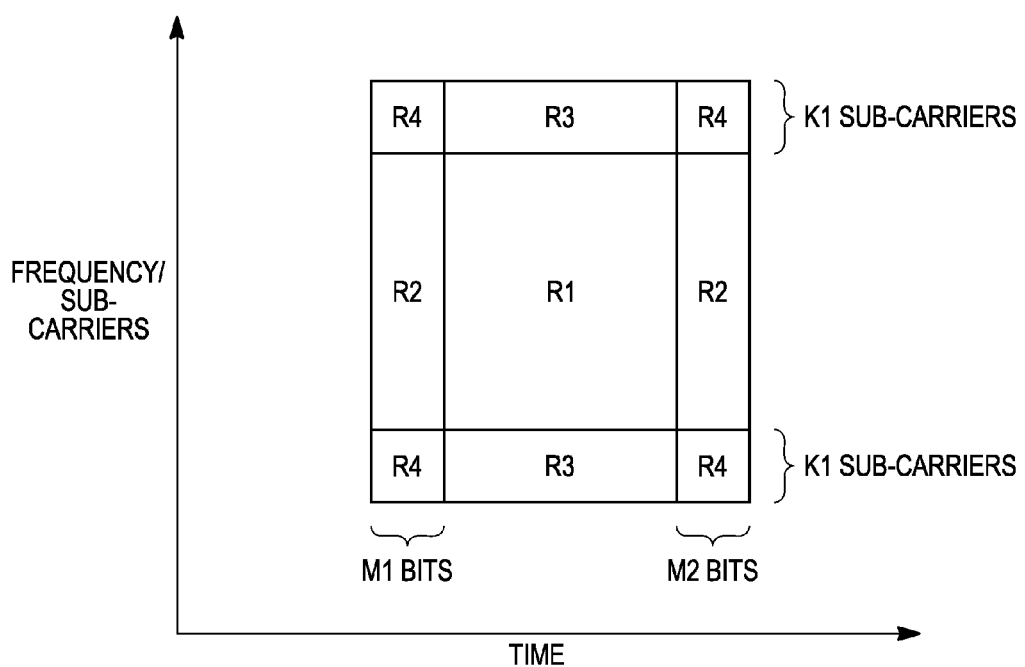
FIG. 5 is an embodiment of mapping priorities in a frame.

FIG. 5 illustrates an example in which the ranker 322 determines that the bits transmitted in regions at the both the temporal and frequency edges of the frame are more likely to be compromised. As used herein, a region is a limited temporal range in a particular sub-carrier. More specifically, in FIG. 5 there are four distinct safety levels: regions R4 at the corners of the frame time slot are most likely to have bits transmitted thereon corrupted due to both ICI and ISI; regions R3 at the frequency edge but in the middle of the frame time slot are less likely to have bits transmitted thereon corrupted than bits transmitted on regions at the corners since these regions only suffer ICI; regions R2 at the ends of the frame time slot but in the middle of the spectrum are less likely to have bits transmitted thereon corrupted than bits transmitted on regions R4 and R3 since these regions only suffer ISI (which is generally more easily corrected or less severe than ICI); and regions R1 at the center of the frame time slot are the least likely to have bits transmitted thereon corrupted since these regions do not suffer from the ISI and ICI caused by the frequency dome windowing and time domain windowing.

Each of the values K1 and M may be different at opposite edges of the frame, as exemplified by M in FIG. 5, which takes the value of M1 regions at the earlier edge of the frame and M2 regions at the later edge of the frame. In one example, the ranker decides the values of K and M based on the windowing shapes in both the frequency and time domains. The sharper the windowing, the wider the interference regions, the bigger the values of K and M. The ranker divides the channel resource into a number of regions dependent on the number of the sub carriers and the size of frame period. For example, for a system with 64 sub-carriers, the frequency domain can be divided into 3 sections: both edges and the middle. For a system with a frame slot of 10 ms, the time domain frame can also be divided into 3 sections: both ends and the middle.

Returning to FIG. 3, the mapper 320 uses the information from the ranker 322 to map the bits of the sets of sources using the priority levels determined by the prioritization block 310. The prioritized bits are then used to fill the regions e.g., from those of highest importance to lowest importance, resulting to the most important data be protected the best and non-critical data having minimum protection. Once the bits are mapped to the sub-carrier and particular portion of a specific frame, they are sent to transmitter elements 324 which amplify, attenuate, up-convert, etc. . . . the mapped data before transmitting it.

Figure 6:
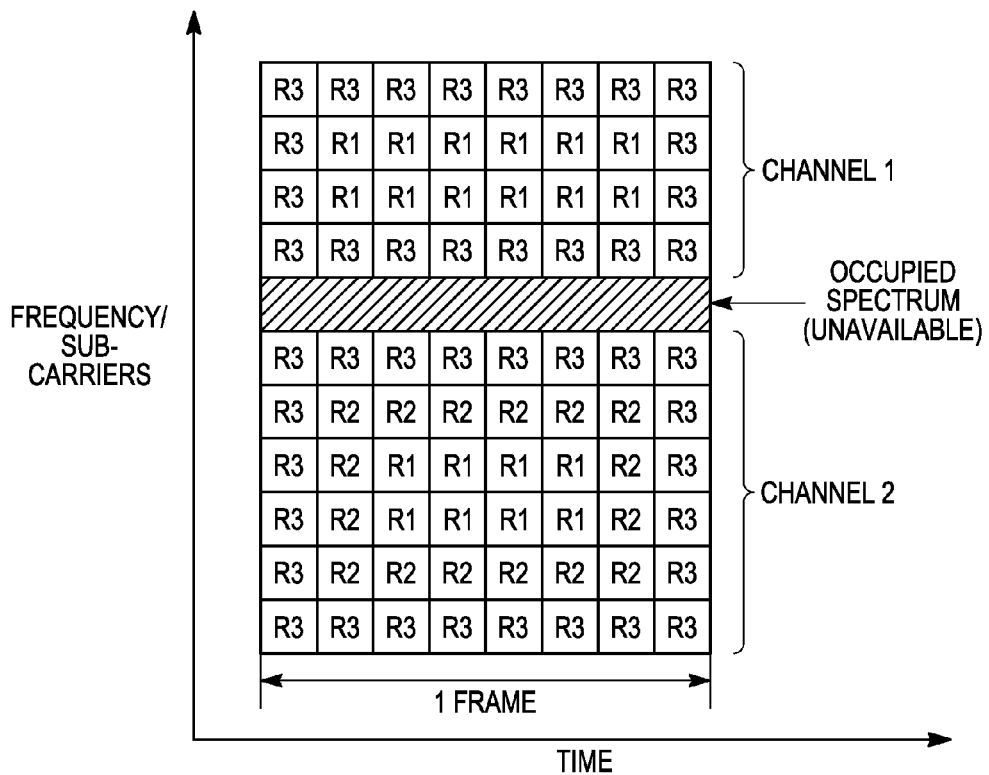
FIG. 6 is an embodiment of spectrum usage in the system.

In one embodiment, different channels may have a different number of priority levels. These channels may have the same or a different number of sub-carriers. One example of such a system is shown in FIG. 6. As illustrated, there are two channels (channel 1 and channel 2) of multiple sub-carriers that are separated by spectrum that is occupied. This spectrum can include one or more sub-carriers. In one example, the spectrum can be occupied by primary devices and the channels may be occupied by secondary devices. However, channel 1 is allocated by the system fewer sub-carriers on which to transmit bits than channel 2. Moreover, the regions of each sub-carrier in channel 1 are categorized into higher and lower safety levels on which the more and less important bits, respectively, are transmitted. The temporal slices of each sub-carrier in channel 2, however, are categorized into three safety levels on which the bits are transmitted. As above, in both channel 1 and channel 2, the least reliable regions of the channel are those on the edges of the frame.

In one specific example, a multimedia (image, video) communication system, such as a narrowband cognitive radio system may use the transmitter described. An image is compressed with a discrete cosine transform (DCT) by an image coder, the bits that represent the smallest coefficients are not as important as the bits that represent high energy coefficients. Thus, the bits with smaller coefficients are mapped to the edges of the frequency-time resource while the bits with bigger coefficients are mapped to the center portions of the frequency-time resource.

In another embodiment, the least important data may be discarded and the next least important data transmitted in the least reliable resource positions rather than the least important data being transmitted on these resources. This may occur, for example, if it is desired to conserve bandwidth or if the data exceeds the available spectrum. Alternatively, the least important data may be discarded if the measured or estimated reliability falls below a predetermined minimum level.

Figure 7:
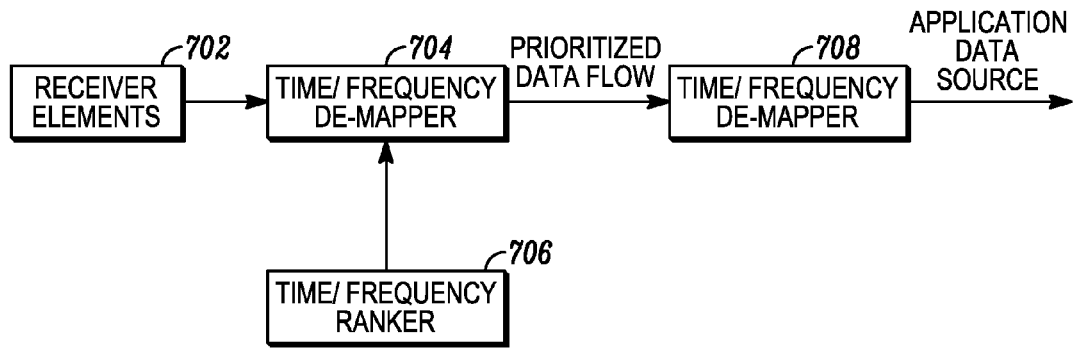
FIG. 7 is a simplified block diagram of an embodiment of a receiver.

FIG. 7 shows a simplified block diagram of a receiver. Similar to FIG. 3, known elements such as mixers, digital-to-analog and analog-to-digital converters, filters, phase shifters, amplifiers, and attenuators as well as feedback loops and I/Q paths, if present, are not shown for simplicity. In the receiver 700, the reverse technique of FIG. 3 is carried out. This is to say that receiver elements 702 receive the signal from the transmitter 300. The signal is supplied to a de-mapper 702 along with ranking information from a ranker 704. The ranker 704 of the receiver 700 carries the same information as the ranker 322 of the transmitter 300 so that the de-mapper 702 is able to combine the ranking information with the mapped bits. In one example, the ranking information is predetermined by the system and the transmitter and the receiver share the same ranking information. In another example, the ranking information is determined by measurement made by the transmitter, the transmitter then sending the ranking information to the receiver. In one embodiment, the transmitter sends this information to the receiver as a special message prior to (and separate from) sending the mapped data. In another embodiment, the transmitter sends this information to the receiver in a frame header of the frame sent to the receiver. This information is then supplied to the de-prioritization block 704 where the bits are reassembled into the proper order.

Figure 8:
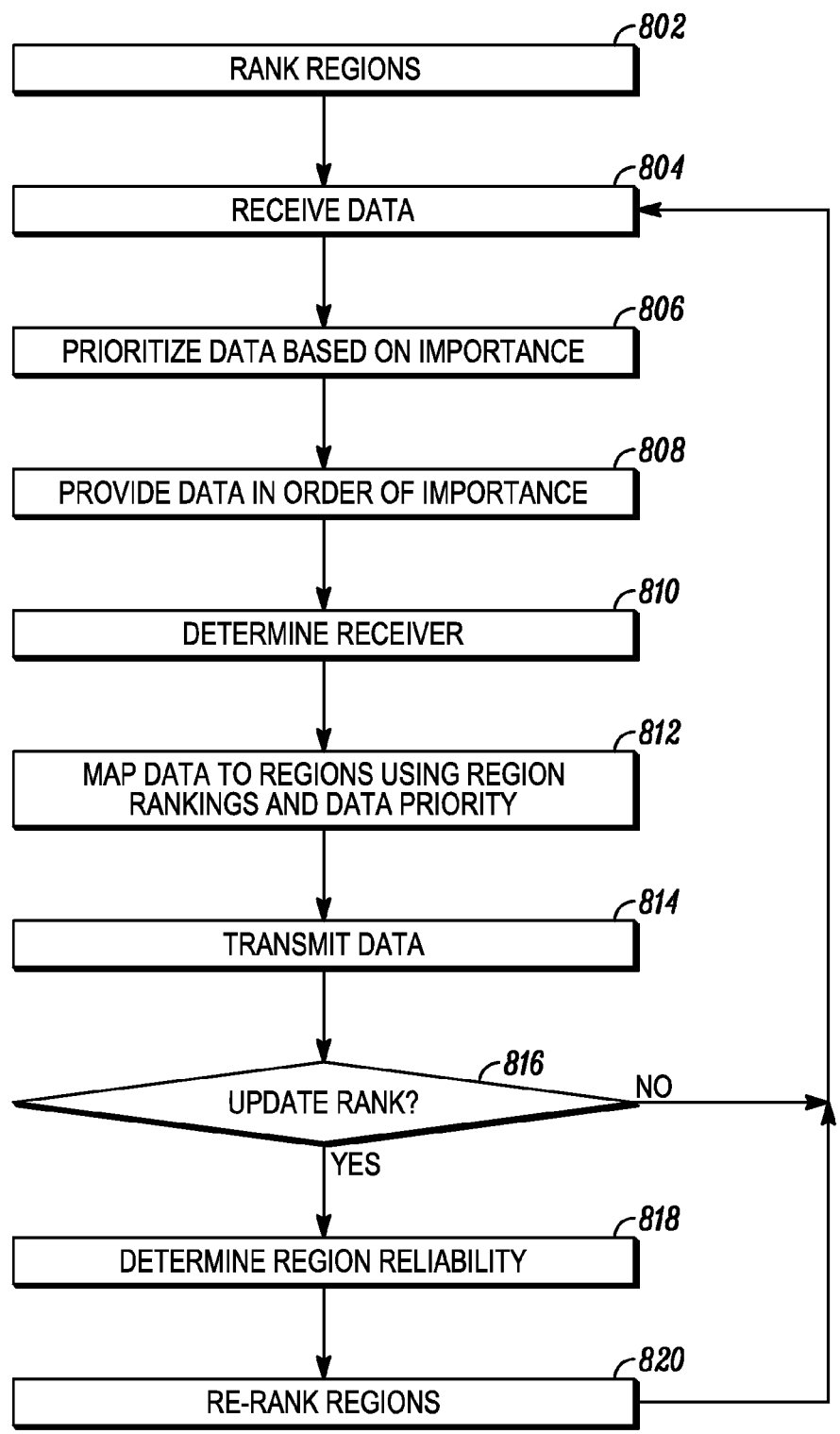
FIG. 8 is a flowchart of one embodiment of prioritization.

One embodiment of a flowchart of the above method is shown in FIG. 8. As illustrated, designated regions of the time/sub-carrier spectrum to be employed for transmission of the signal are initially ranked dependent on the reliability of communications for at least one receiver at step 802. The rankings are obtained using ISI or ICI estimation or measurement of the transmission reliability of each region. The size of each region is predetermined and may differ, e.g., between channels in a multi-carrier system. Data is received for transmission at step 804 from an external source (such as a microphone or camera of the transmitter or other device linked to the transmitter). The data is separated into portions of predetermined size and these portions are prioritized into different based on the level of importance of the portion at step 806. These portions may be any size that is sufficient to be transmitted within the allotted region, such as bits. The data is then output, e.g., temporally in order of importance at step 808. The data that is prioritized may include both control information and data bits such as speech or image data or merely data bits alone.

After determining to which receiver the data is to be transmitted at step 810, the prioritized data is mapped to the ranked regions at step 812. As above, determination of the receiver at step 810 may not be performed, e.g., if different rankings are not stored in memory of the transmitter, if the receivers do not provide channel condition feedback to the transmitter, or if all of the receivers have regions with the same rankings (or perhaps close to the same rankings). Other devices in the system (not shown) may measure or estimate the ICI and ISI between a transmitter and particular receiver and provide the information to the communication devices.

In any case, after the data has been mapped to the ranked regions at step 812, it is transmitted at step 814. The method then optionally proceeds at step 816 by determining whether to update the rankings. This may be triggered by various means, such as the time difference between the last update and the present time or by updating channel conditions supplied by one or more of the receivers. In the latter case, the update may occur whenever an update is received or only if there are sufficient changes in the channel conditions (e.g., the change in fading or interference in one or more of the regions exceeds a predetermined threshold). If the rankings are to be updated, the reliability of at least the regions in which change has occurred (or all of the regions) is evaluated by measurement or estimation at step 818 and the spectrum re-ranked accordingly at step 820. This re-ranking may occur, for example, at designated evaluation/sensing times between transmissions. The times may be designated by the device (e.g., training sessions) or by the communication system.

It is evident that a number of the steps shown in FIG. 8 need not occur at the positions shown. For example, determination of the receiver and updating of the rankings may occur at any point after the data is received and before the rankings are used to map the data to the regions. Moreover, other steps may be present prior to transmission of the data.

The mapping scheme described above can be integrated into a multi-carrier system such as a FMT system. At the FMT transmitter, the traditional serial-to-parallel converter of the FMT transmitter is replaced by space time-frequency mapping while at the FMT receiver, the traditional parallel-to-serial converter will be replaced by space time-frequency de-mapping. As noted in reference to FIG. 3 other elements of the transmitter may include, for example, a processor such as an FFT, baseband filters, and a parallel-to-serial converter. Note that although multi-sub-carrier systems have been described, the above technique can be employed in systems in which a single carrier is used for transmission by splitting the single carrier into temporal regions and evaluating the reliability of each region.

The algorithm used for resource allocation and data protection described herein may be a computer program product that includes a series of computer instructions fixed either on a tangible medium, such as a computer readable medium (e.g., flash memory, CD-ROM, ROM, fixed disk). The medium may be a tangible medium (e.g., optical or analog communications lines). The series of computer instructions embodies all or part of the functionality previously described herein with respect to the device. It should appreciate that such computer instructions can be written in a number of programming languages for use with many device architectures or operating systems. Furthermore, such instructions may be stored in any memory device, such as semiconductor, magnetic, optical or other memory—e.g., one of the memories shown in FIG. 2. It is expected that such a computer program product may be distributed as a removable medium with accompanying printed or electronic documentation (e.g., shrink wrapped software) or preloaded with a device (e.g., on system ROM or fixed disk). The computer program product may be run on one or more processors, such as the processor shown in FIG. 2.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure and Summary section are provided to allow the reader to quickly ascertain the nature of the technical disclosure. It is submitted with the understanding that neither will be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Those skilled in the art will recognize that a wide variety of modifications, alterations, and combinations can be made with respect to the above described embodiments without departing from the spirit and scope of the invention and that such modifications, alterations, and combinations are to be viewed as being within the scope of the inventive concept. Thus, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims issuing from this application. The invention is defined solely by any claims issuing from this application and all equivalents of those issued claims.

The invention claimed is:

1. A method of protecting data to be transmitted in a communication system, the method comprising:
dividing a communication channel resource over which the data is to be transmitted in a frame time slot into regions, wherein the communication channel resource comprises multiple sub-carriers in a spectrum and each region is a different temporal position within one of the sub-carriers;
separating the data into data portions, each data portion able to be transmitted over one of the regions;
ranking the regions based on the transmission reliability thereon;
prioritizing the data portions based on the importance of the data portions; and
mapping the prioritized data portions to the ranked regions such that more important data portions are mapped to more reliable regions and less important data portions are mapped to less reliable regions, wherein the regions are ranked such that regions at edges of the spectrum are less reliable than regions more proximate to a center of the spectrum, the data portions being mapped such that the more important data portions are mapped to the regions more proximate to the center of the spectrum and the less important data portions are mapped to the regions at the edges of the spectrum.

2. The method of claim 1, further comprising determining a receiver to which the data is to be transmitted, wherein the rankings of the regions are dependent on the determined receiver.

3. The method of claim 1, further comprising updating the rankings based on channel feedback of the spectrum on which the data is to be transmitted.

4. The method of claim 1, further comprising updating the rankings at predetermined intervals.

5. The method of claim 1, wherein different sets of data are to be transmitted over different channels, the different channels able to have at least one of different number of ranking levels or a different number of sub-carriers.

6. The method of claim 1, wherein the prioritized data is output temporally in order of importance to enable the mapping of the prioritized data.

7. A method of protecting data to be transmitted in a communication system, the method comprising:
dividing a communication channel resource over which the data is to be transmitted in a frame time slot into regions, wherein the communication channel resource comprises multiple sub-carriers in a spectrum and each region is a different temporal position within one of the sub-carriers;
separating the data into data portions, each data portion able to be transmitted over one of the regions;
ranking the regions based on the transmission reliability thereon;
prioritizing the data portions based on the importance of the data portions; and mapping the prioritized data portions to the ranked regions such that more important data portions are mapped to more reliable regions and less important data portions are mapped to less reliable regions, wherein the regions are ranked such that regions at both ends of the frame time slot are less reliable than regions more proximate to a center of the time slot, the data portions being mapped such that the more important data portions are mapped to the regions more proximate to the center of the time slot and the less important data portions are mapped to the regions at the ends of the time slot.

8. A method of protecting data to be transmitted in a communication system, the method comprising:
dividing a communication channel resource over which the data is to be transmitted in a frame time slot into regions, wherein the communication channel resource comprises only a single carrier and each region is a different temporal position within that single carrier;
separating the data into data portions, each data portion able to be transmitted over one of the regions;
ranking the regions based on the transmission reliability thereon;
prioritizing the data portions based on the importance of the data portions; and
mapping the prioritized data portions to the ranked regions such that more important data portions are mapped to more reliable regions and less important data portions are mapped to less reliable regions, wherein the regions are ranked such that regions at both ends of the time slot are less reliable than regions more proximate to a center of the time slot, the data portions being mapped such that the more important data portions are mapped to the regions more proximate to the center of the time slot and the less important data portions are mapped to the regions at the ends of the time slot.

9. A communication device comprising:
a prioritizer configured to receive data separated into data portions and prioritize the data portions based on the importance of the data portions;
a ranker configured to rank regions of a communication channel resource over which the data is to be transmitted in a frame time slot based on the transmission reliability thereon, each data portion able to be transmitted over one of the regions, wherein the communication channel resource comprises multiple sub-carriers in a spectrum and each region is a different temporal position within one of the sub-carriers; and
a mapper configured to map the prioritized data portions to the ranked regions such that more important data portions are mapped to more reliable regions and less important data portions are mapped to less reliable regions, wherein the regions are ranked such that regions at edges of the spectrum are less reliable than regions more proximate to a center of the spectrum, the data portions being mapped such that the more important data portions are mapped to the regions more proximate to the center of the spectrum and the less important data portions are mapped to the regions at the edges of the spectrum.

10. The device of claim 9, further comprising a memory that stores the rankings of the regions for different receivers to which the data is to be transmitted, the rankings of the regions dependent on the receiver.

11. The device of claim 9, wherein different sets of data are to be transmitted over different channels, the ranker further configured to provide a different number of ranking levels for the different channels.

12. The device of claim 9, wherein the prioritizer is further configured to output the prioritized data temporally in order of importance to the mapper.

13. A communication device comprising:
- a prioritizer configured to receive data separated into data portions and prioritize the data portions based on the importance of the data portions;
- a ranker configured to rank regions of a communication channel resource over which the data is to be transmitted in a frame time slot based on the transmission reliability thereon, each data portion able to be transmitted over one of the regions, wherein the communication channel resource comprises multiple sub-carriers in a spectrum and each region is a different temporal position within one of the sub-carriers; and
- a mapper configured to map the prioritized data portions to the ranked regions such that more important data portions are mapped to more reliable regions and less important data portions are mapped to less reliable regions, wherein the regions are ranked such that regions at both ends of the time slot are less reliable than regions more proximate to a center of the time slot, the data portions being mapped such that the more important data portions are mapped to the regions more proximate to the center of the time slot and the less important data portions are mapped to the regions at the ends of the time slot.

14. A communication device comprising:
- a prioritizer configured to receive data separated into data portions and prioritize the data portions based on the importance of the data portions;
- a ranker configured to rank regions of a communication channel resource over which the data is to be transmitted in a frame time slot based on the transmission reliability thereon, each data portion able to be transmitted over one of the regions, wherein the communication channel resource comprises a single carrier in a channel and each region is a different temporal position within that carrier; and
- a mapper configured to map the prioritized data portions to the ranked regions such that more important data portions are mapped to more reliable regions and less important data portions are mapped to less reliable regions, wherein the regions are ranked such that regions at both ends of the time slot are less reliable than regions more proximate to a center of the time slot, the data portions being mapped such that the more important data portions are mapped to the regions more proximate to the center of the time slot and the less important data portions are mapped to the regions at the ends of the time slot.

* * * * *